(No Model.) 2 Sheets—Sheet 1.
T. G. WEBB.
APPARATUS FOR CONCENTRATING SULFURIC ACID.
No. 582,329. Patented May 11, 1897.
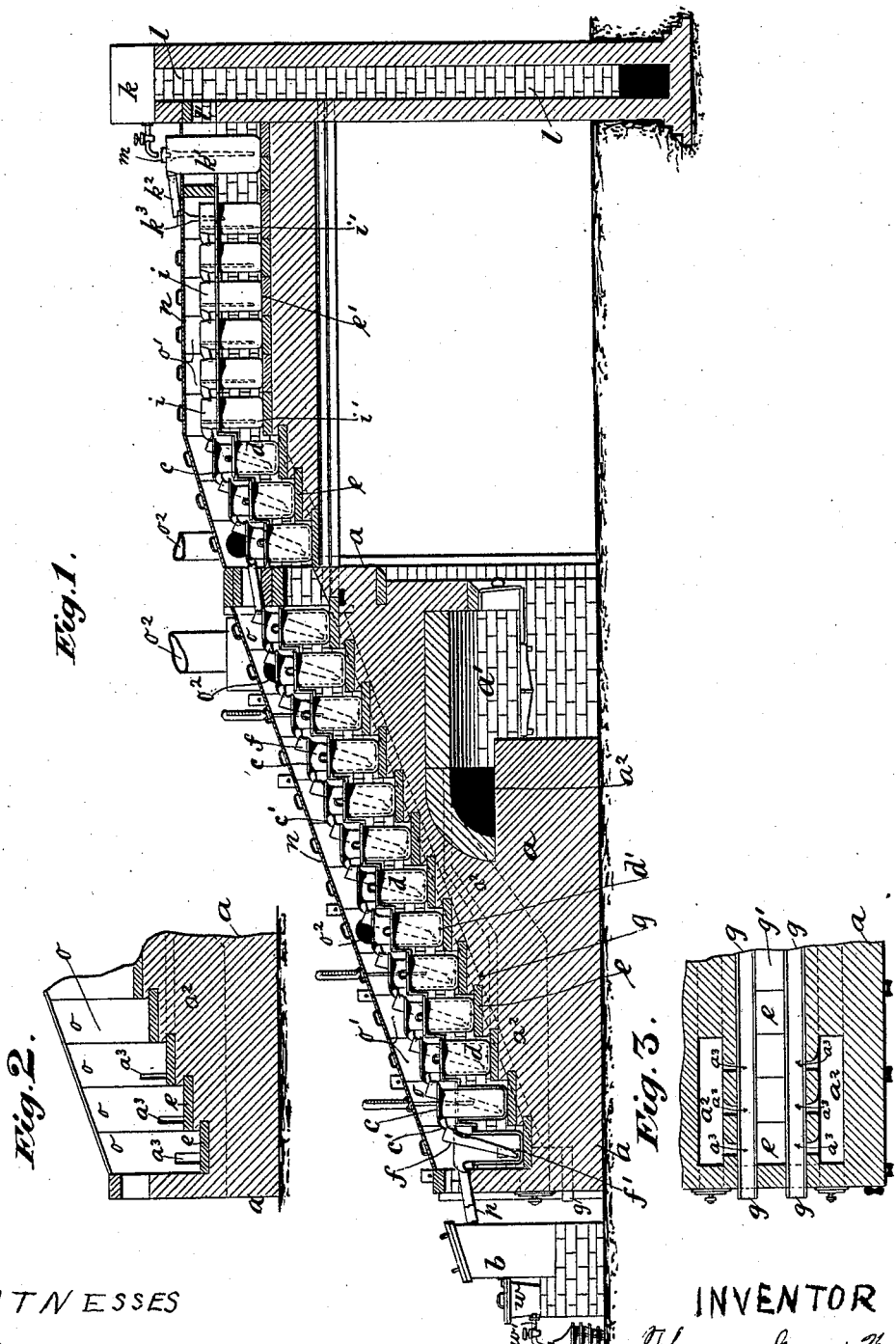
WITNESSES
INVENTOR
Thomas George Webb
Atty's.

(No Model.) 2 Sheets—Sheet 2.
T. G. WEBB.
APPARATUS FOR CONCENTRATING SULFURIC ACID.
No. 582,329. Patented May 11, 1897.
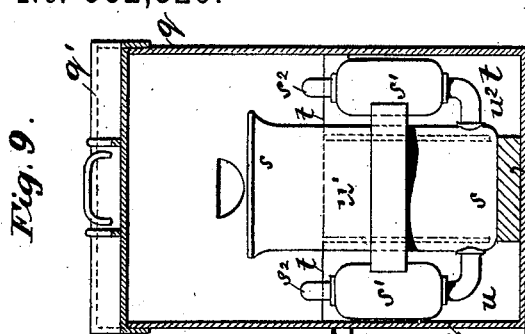
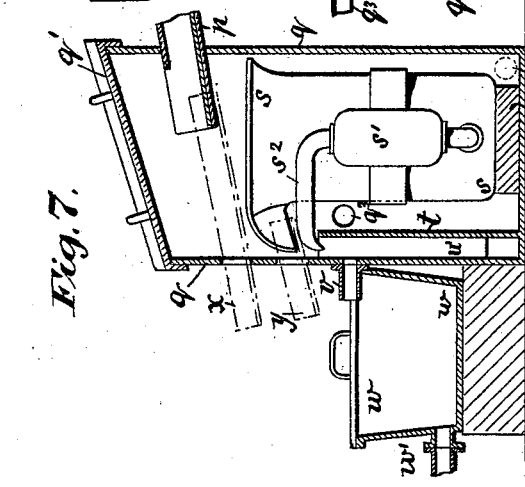
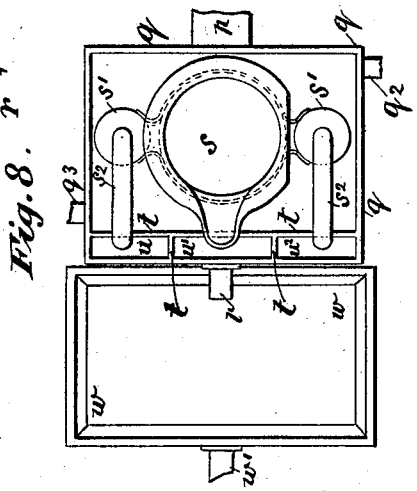
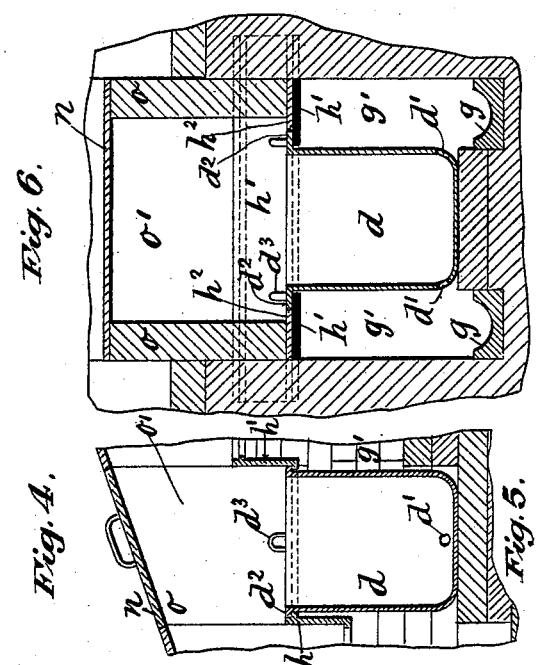
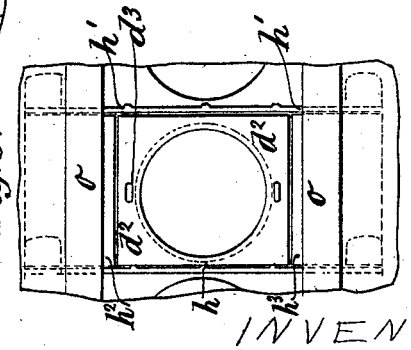
WITNESS:
Otto Munk
H. W. Hopping
INVENTOR
Thomas George Webb
by Richard Ford
Attys

UNITED STATES PATENT OFFICE.

THOMAS G. WEBB, OF MANCHESTER, ENGLAND.

APPARATUS FOR CONCENTRATING SULFURIC ACID.

SPECIFICATION forming part of Letters Patent No. 582,329, dated May 11, 1897.

Application filed July 8, 1896. Serial No. 598,497. (No model.) Patented in England February 9, 1891, No. 2,343.

*To all whom it may concern:*

Be it known that I, THOMAS GEORGE WEBB, a subject of the Queen of Great Britain, and a resident of Manchester, in the county of Lancaster, England, have invented new and useful Improvements in Apparatus for Concentrating and Cooling Sulfuric Acid, (for which I have obtained a patent in Great Britain, No. 2,343, dated February 9, 1891,) of which the following is a specification.

My invention relates to apparatus for concentrating and cooling sulfuric acid, constructed and arranged in a simple, durable, and inexpensive manner, all parts of it being readily accessible for repairs or other purposes, as I shall describe. I attain these objects by the mechanism illustrated in the accompanying drawings, in which—

Figure 1, Sheet I, is a longitudinal section of the furnace, but showing the vessels and cooler in elevation. Figs. 2 and 3 are respectively a vertical sectional and a sectional plan of a portion of the furnace, showing the way in which the products of combustion enter the space in which the concentrating vessels are situated. Fig. 4, Sheet II, is a vertical section, Fig. 5 a plan, and Fig. 6 a sectional front view on an enlarged scale, of a bowl and its fittings adapted to receive the concentrating vessel. Fig. 7 is a vertical section, Fig. 8 a plan, and Fig. 9 a front view, partly in section, of the cooler on an enlarged scale.

Similar letters refer to similar parts throughout the several views.

Referring to Fig. 1, $a$ is the furnace; $a'$, the fire; $b$, the cooler; $c$, the concentrating vessels; $d$, the iron bowls which receive the latter.

In carrying out my invention I preferably arrange the furnace $a$ in a line with the concentrating vessels $c$, the products of combustion passing into chambers or flues $a^2$, arranged in front of the furnace $a$. The top of the furnace $a$ is formed step-like and covered with slabs $e$, and on each step is placed a deep cylindrical iron bowl $d$, in which is placed a porcelain concentrating vessel $c$, the latter reaching a short distance above the bowl $d$. Each of the concentrating vessels $c$ is formed with a projecting lip $c'$, forming an overflow-spout at its upper edge and receiving a tapered tube $f$, preferably made of enameled iron or of porcelain placed loosely at an angle. The said tube reaches from the lip $c'$ of the next higher to the bottom of the next lower vessel $c$, the lower end of this tube having an outlet-slit $f'$.

The bowls $d$ serve to protect the concentrating vessels $c$ and to catch their contents should they break, holes $d'$ being formed in the side near the bottom of the bowl $d$, from which the liquid escapes into channels $g$, formed in the brickwork along each side of the bowls $d$ and leading out of the apparatus, where the liquid can be readily observed. Each bowl is formed at its upper end with a flange $d^2$, adapted to rest upon cross-plates $h$ $h'$, built into the brickwork, and upon which are also placed side plates $h^2$ $h^3$, forming a continuation of the flange $d^2$ and having their outer ends built into the brickwork.

To facilitate the removal of the iron bowls $d$ when required, I furnish each end thereof with an eye $d^3$, which permit of lifting the bowls by means of hooks.

In connection with the stepped series of concentrating vessels described another series $i$ is employed at the upper end thereof, but arranged upon a horizontal floor $e'$. Each of these vessels $i$ has a partition $i'$ nearly reaching to its bottom and is formed at the top with a spout adapted to reach over the back of the adjacent vessel and thus convey the liquid from one vessel to the other. At the end of the said horizontal series of concentrating vessels a tank $k$ is employed over the chimney-flue $l$, from which tank the acid to be concentrated is run to the bottom of a cylinder $k'$ by means of a funnel $m$, placed in the same, and from the cylinder $k'$ by means of a channel $k^2$ and another funnel $k^3$ into the first of the series of horizontally-placed concentrating vessels.

The two series of concentrating vessels $c$ and $i$ are roofed in by means of iron plates $n$, which join each other and rest at each end upon blocks $o$, (see Figs. 1, 2, 4, 5, and 6,) made of fire-clay and built into the brickwork of the furnace $a$, each of the said plates covering the space of one vessel and being readily removable to allow of examining or removing the latter.

The space $o'$ above the concentrating vessels $c$ and $i$ communicates with pipes $o^2$ and $o^2$, which serve to carry off fumes, and the space $g'$ around the concentrating vessels $c$ and $i$ with the furnace-flue $a^2$ by means of openings $a^3$, (see Figs. 1, 2, and 3,) and at $l'$ with the chimney-flue $l$.

The acid concentrated is conveyed from the last vessel of the stepped series by means of a channel $p$ into a cooler $b$, formed as follows: Inside a tank $q$, (see Figs. 7, 8, and 9,) having a lid $q'$ and water inlet and outlet pipes $q^2$ and $q^3$, respectively, is employed upon a slab $r$ a cylindrical vessel $s$, open at the top and having connected to each side a pipe $s'$, the lower ends of which communicate with the lower part of the vessel $s$ and the upper ends being each formed with a pipe $s^2$, reaching over a partition $t$, formed across and extending about half-way up the tank $q$. By means of two other partitions $t$, which reach not quite to the bottom of the tank $q$, the latter is divided into three compartments $u$ $u'$ $u^2$, the pipes $s^2$ being in communication with the outer compartments $u$ and $u^2$, respectively. The front of the tank $q$ is formed with an outlet-pipe $v$, which communicates with the compartment $u'$ and a tank $w$, having also an outlet-pipe $w'$.

The whole of the apparatus described works in the following manner: The hot products of combustion from the fire $a'$ pass into the flue $a^2$ and through openings $a^3$ into the space $g'$, where they circulate around the vessels $d$, $c$, and $i$, thus heating them, and finally descending through openings $l'$ into the chimney-flue $l$. Weak sulfuric acid supplied from the tank $k$, where it is somewhat heated by the chimney-flue $l$, flows through the funnel $m$ into the cylinder $k'$, from which it is conveyed by a channel $k^2$ and another funnel $k^3$ into the first of the series of horizontally-arranged vessels $i$. From this the acid overflows into the adjacent vessels successively until it overflows into the tapered tube $f$ in the highest of the stepped series of vessels $c$. The acid overflows in the same manner from one of the vessels $c$ to the other until it arrives in the lowest one, where by means of the channel $p$ it is conveyed into the cooler $b$. The acid in flowing from vessel to vessel becomes more and more concentrated, while the fumes evolved escape from the space $o'$ through the pipes $o^2$ and $o^2$, and by arranging the overflow from each of the vessels $c$ to descend by a tube $f$ to the bottom of the next vessel I insure that all portions of the liquid are subjected to heating while they reascend to overflow again. If the weak acid simply overflowed from one vessel to the next without being forced to descend, it would, owing to its comparative lightness, be liable to flow merely across the upper part of the vessel, whereas by conducting it down to the bottom it displaces a portion of the liquid above it, causing overflow of that which has been heated while ascending from the bottom.

The acid in entering the cooler falls into the cylindrical vessel $s$, which at the beginning of the operation is charged with about two gallons of cold white sulfuric acid of not less than 1,840 specific gravity. Water is then caused to circulate through the tank $q$ and retained therein at a level below the partition $t$ by means of the overflow or pipe $q^3$. As the acid rises in the vessel $s$ it is proportionately drawn off from the bottom through pipes $s'$ and $s'$, when it empties itself into the side compartments $u$ $u^2$, from whence it passes into the middle compartment $u'$. The outlet-pipe $v$ then leads the acid into the tank $w$, cooled to about 60° Fahrenheit, ready for bottling, the channel $x$ (shown in dotted lines) being employed only temporarily when commencing the operation, to receive and conduct the liquid to the tank $w$ until the acid begins to flow clear and limpid, after which it is removed and the liquid allowed to run into the cylindrical vessel $s$, as described. The channel $y$ (also shown in dotted lines) is employed in case of emergency to convey the liquid from the cylindrical vessel $s$ to the tank $w$.

The numbers and dimensions of the vessels $c$ and $i$ may obviously be varied, and a single fire or more than two fires or gas-burners might be used for heating them, these appliances being arranged in any convenient manner to give an approximately uniform heat throughout the chamber containing the vessels $c$ and $i$, without any openings which might allow cold air to strike against the same.

What I claim as my invention, and desire to secure by Letters Patent, is—

1. For concentrating sulfuric acid, a series of acid-resisting vessels placed on steps in a heating-chamber $g'$, each of these vessels $c$ being made with an overflow-spout $c'$ and having placed in it a taper-tube $f$ reaching down to its bottom from the spout of the next higher vessel, and a metal outer vessel $d$ adapted to protect the vessel $c$ and catch its contents in case of leakage, arranged and operating substantially as herein described.

2. In an apparatus for concentrating sulfuric acid, a concentrating vessel, a metal inclosing vessel provided with openings $d'$ in the lower portion of the same, and channels $g$ below and on each side thereof to receive the discharge therefrom, substantially as described.

3. In an apparatus for concentrating sulfuric acid, a cooling device consisting of a tank $q$ formed internally at one side with three compartments $u$, $u'$, $u^2$, at the bottom communicating with each other, in combination with a cylindrical vessel $s$ inside the tank $q$ which vessel receives the concentrated acid and has siphon-pipes $s'$, $s'$, the upper ends $s^2$ of which communicate with the outer compartments $u$ and $u^2$ and the middle compartment $u'$ with an outlet-pipe $v$ for the delivery of the cooled concentrated acid while cold water is adapted to circulate through the tank $w$ at a level below the said compartments, all substantially as and for the purpose set forth.

In witness whereof I have hereunto set my hand in presence of two witnesses.

THOS. G. WEBB.

Witnesses:
JAMES McBURNIE,
STANLEY E. BRAMALL.